United States Patent
Chang et al.

(10) Patent No.: US 7,154,560 B1
(45) Date of Patent: Dec. 26, 2006

(54) WATERMARKING OF DIGITAL IMAGE DATA

(76) Inventors: Shih-Fu Chang, 560 Riverside Dr. - Apt. 18K, New York, NY (US) 10027; Jianhao Meng, 435 W. 119th St. - Apt. 9L, New York, NY (US) 10027

( * ) Notice: Subject to any disclaimer, the term of this patent is extended or adjusted under 35 U.S.C. 154(b) by 0 days.

(21) Appl. No.: 09/530,308

(22) PCT Filed: Oct. 27, 1998

(86) PCT No.: PCT/US98/22790

§ 371 (c)(1),
(2), (4) Date: Sep. 5, 2000

(87) PCT Pub. No.: WO99/22480

PCT Pub. Date: May 6, 1999

Related U.S. Application Data

(60) Provisional application No. 60/063,509, filed on Oct. 27, 1997.

(51) Int. Cl.
*H04N 9/76* (2006.01)
*H04N 7/67* (2006.01)
*H04L 9/00* (2006.01)
*G09C 5/00* (2006.01)

(52) U.S. Cl. .................. 348/598; 380/54; 713/176; 283/113; 382/100; 348/584; 348/589; 348/600

(58) Field of Classification Search ............... 348/589, 348/600, 586, 461, 467, 584, 598; 380/201, 380/54; 283/113, 72; 713/176; 382/100, 382/115, 140, 284; 358/3.28

See application file for complete search history.

(56) References Cited

U.S. PATENT DOCUMENTS

| | | | | |
|---|---|---|---|---|
| 5,530,759 | A * | 6/1996 | Braudaway et al. | 380/54 |
| 5,664,018 | A * | 9/1997 | Leighton | 380/54 |
| 5,734,752 | A * | 3/1998 | Knox | 358/3.28 |
| 5,790,703 | A * | 8/1998 | Wang | 358/3.28 |
| 5,809,139 | A * | 9/1998 | Girod et al. | 380/202 |
| 5,809,160 | A * | 9/1998 | Powell et al. | 382/100 |
| 5,825,892 | A * | 10/1998 | Braudaway et al. | 380/51 |
| 5,848,155 | A * | 12/1998 | Cox | 382/191 |
| 5,870,754 | A * | 2/1999 | Dimitrova et al. | 707/104.1 |
| 5,915,027 | A * | 6/1999 | Cox et al. | 380/54 |
| 5,949,885 | A * | 9/1999 | Leighton | 380/54 |
| 5,960,081 | A * | 9/1999 | Vynne et al. | 713/176 |
| 6,031,914 | A * | 2/2000 | Tewfik et al. | 380/54 |
| 6,208,735 | B1 * | 3/2001 | Cox et al. | 380/54 |
| 6,222,932 | B1 * | 4/2001 | Rao et al. | 382/100 |
| 6,453,053 | B1 * | 9/2002 | Wakasu | 382/100 |

OTHER PUBLICATIONS

Cox et al., Secure Spread Spectrum Watermarking for Multimedia, NEC Research Institute, Technical Report 95-10, Dec. 4, 1995-pp. 1 of 1and 1-33.*

* cited by examiner

*Primary Examiner*—Brian P. Yenke
*Assistant Examiner*—Jean W. Désir
(74) *Attorney, Agent, or Firm*—Baker Botts LLP

(57) ABSTRACT

Digital watermarks can serve to indicate copyright ownership of digitized video. When video images are transmitted as transformed by discrete cosine transformation (DCT) for compression, with or without motion compensation, it is advantageous to include a watermark after transformation. To this end, a DCT watermark is generated for optimal visibility based on the original image data, and the generated watermark is superposed on the transformed data.

5 Claims, 4 Drawing Sheets

WATERMARKING OF DIGITAL IMAGE DATA

Priority is claimed based on U.S. Provisional Application No. 60/063,509, filed Oct. 27, 1997.

TECHNICAL FIELD

This invention relates to providing digital image data with a watermark, and, more particularly, where the image data are video data.

BACKGROUND OF THE INVENTION

A conventional watermark, on a paper document, may consist of a translucent design which is visible when the document is held to the light. Or, more generally, a watermark may be viewed under certain lighting conditions or at certain viewing angles. Such watermarks, which are difficult to forge, can be included for the sake of authentication of documents such as bank notes, checks and stock certificates, for example.

In digital video technology, watermarks are being used to betoken certain proprietary rights such as a copyright, for example. Here, the watermark is a visible or invisible pattern which is superposed on an image, and which is not readily removable without leaving evidence of tampering. Resistance to tampering is called "robustness".

One robust way of including a visible watermark in a digitized image is described by Braudaway et al., "Protecting Publically Available Images with a Visible Image Watermark", IBM Research Division, T. J. Watson Research Center, Technical Report 96A000248. A luminance level, $\Delta L$, is selected for the strength of the watermark, and the luminance of each individual pixel of the image is modified by $\Delta L$ and a nonlinear function. For increased security, the level $\Delta L$ is randomized over all the pixels in the image.

SUMMARY OF THE INVENTION

When images are transmitted as transformed by discrete cosine transformation (DCT) for compression, with or without motion compensation, it is advantageous to include a watermark after transformation. To this end, (i) a DCT watermark is generated for optimal visibility based on the original image data, and (ii) the generated watermark is superposed on the transformed data.

DETAILED DESCRIPTION

A Mask Generation Module generates a DCT watermark mask based on the original video content. A Motion Compensation Module efficiently inserts the watermark in the DCT domain and outputs a valid video bitstream at specified bitrate. The following description applies specifically to image data in MPEG format.

MPEG video consists of groups of pictures (GOP) as described in document ISO/IEC 13818-2 Committee Draft (MPEG-2). Each GOP starts with an intra coded "I-frame", followed by a number of forward-referencing "P-frames" and bidirectionally-referencing "B-frames".

With motion compensation, when a watermark is inserted in an I-frame, the P- and B-frames in the GOP will be changed also. For such correction, the motion compensation on the watermark in an anchor or base frame must be subtracted when the watermark is added to a current frame. For such subtraction, the technique of motion compensation in the DCT domain can be used as described by S. F. Chang et al., "Manipulation and Compositing of MC-DCT Compressed Video", IEEE Journal of Selected Areas in Communications, Special Issue on Intelligent Signal Processing, pp. 1–11, January 1995.

In a video sequence, the image content changes from frame to frame. Thus, to keep a watermark sufficiently visible throughout the video, the watermark must be adapted to the video contents. For example, when an image is complicated or "busy", i.e., when it has many high-frequency components, the watermark should be stronger. For different regions in the same video frame, the watermark should be scaled regionally—thereby enhancing the security against tampering.

(i) Mask Generation Module

Figure 4:
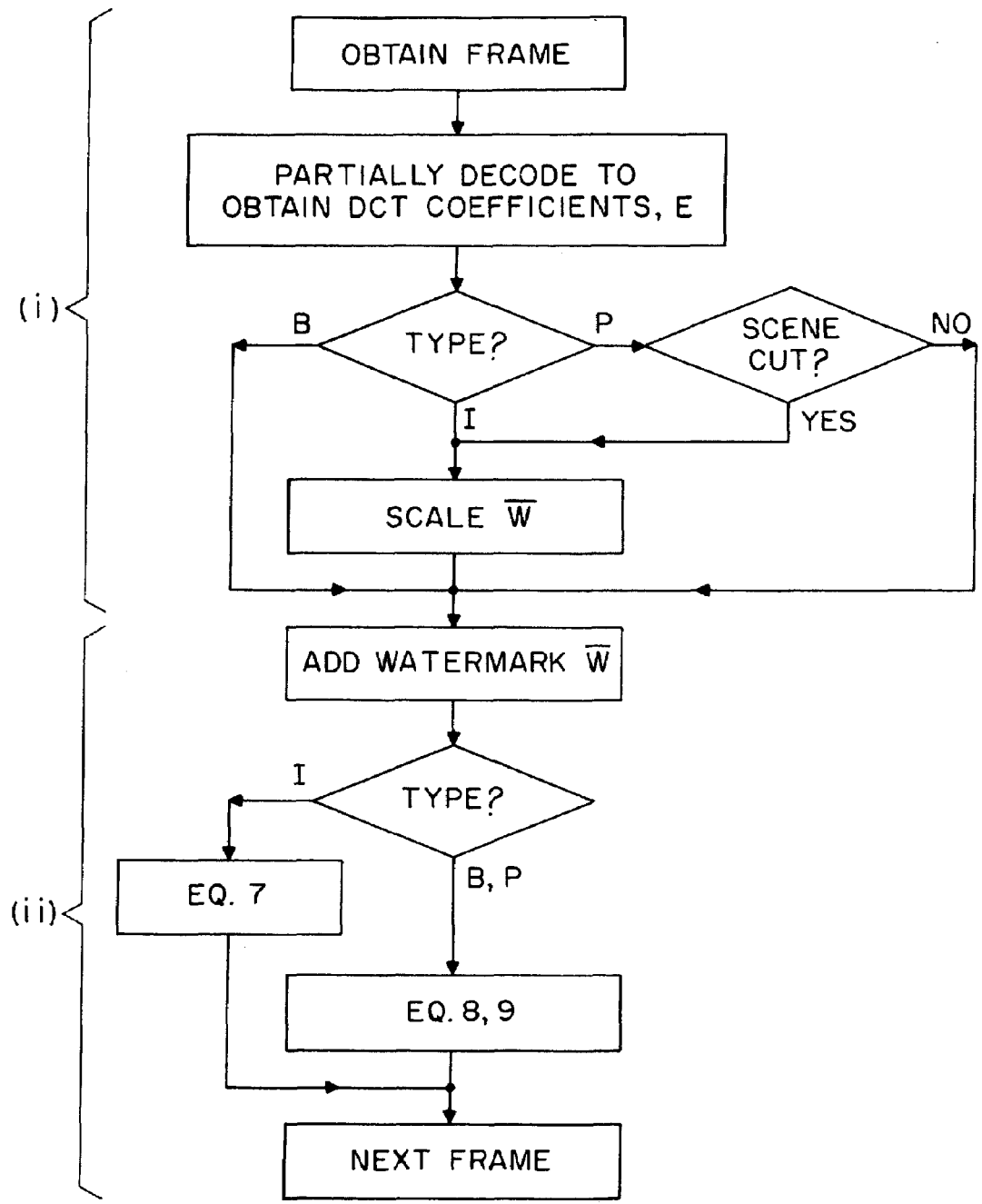
FIG. 4 is a flow diagram of watermark superposition processing.

In this module, as illustrated by Section (i) of FIG. 4, a watermark mask image is first generated for each GOP, or for the first P-frame after a scene cut. This is based on the fact that video content tends to be consistent within a GOP which is usually about 15 frames or 0.5 second long. But, when there is a scene cut within a GOP, visual content will change significantly, and a new mask is used to adapt to the new visual content. Thus, the watermark mask is superposed on the I-frame, or on the first P-frame after a scene cut.

Figure 3:
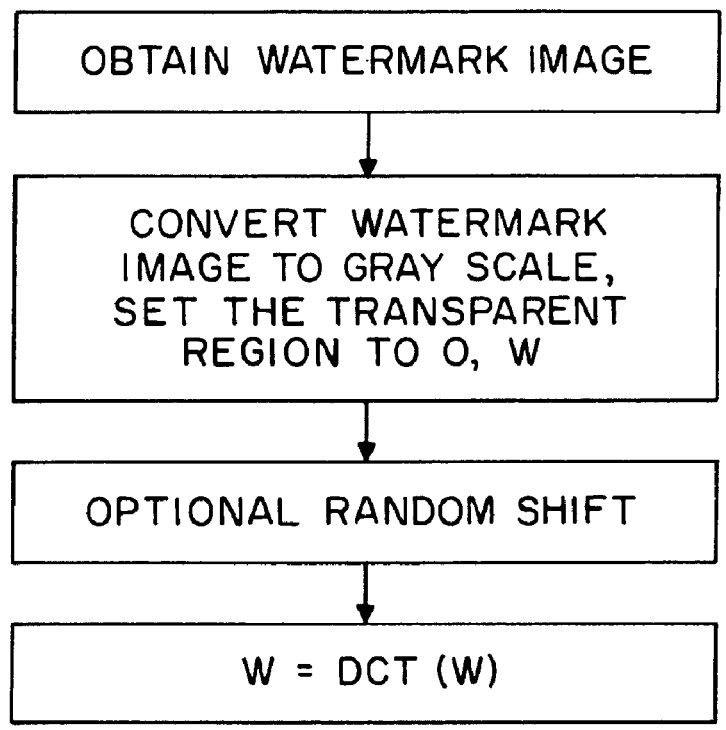
FIG. 3 is a flow diagram of initial processing.

To generate the mask, as illustrated by FIG. 3, the input watermark image is first converted to a gray scale image. Only the luminance channel of each image is modified. A transparent color (background color) is chosen. The luminance of all watermark pixels having the transparent color value is set to 0. Optionally, the mask image is randomly shifted in both x- and y-direction. A DCT is applied to obtain the DCT mask of the watermark. The luminance of the mask will be scaled adaptively according to the input image content before adding to the input image.

In the pixel domain, the following formulae have been proposed in the above-referenced report by G. W. Braudaway et al.:

$$w_{nm}' = w_{nm} \cdot y_w / 38.667 \cdot (y_{nm}/y_w)^{2/3} \cdot \Delta L \text{ for } y_{nm}/y_w > 0.008856,$$

$$w_{nm}' = w_{nm} \cdot y_w / 903.3 \cdot \Delta L \text{ for } y_{nm}/y_w \leq 0.008856 \quad (1)$$

where $w_{nm}'$ is the scaled watermark mask that will be added to the original image, $w_{nm}$ is the non-transparent watermark pixel value at pixel (n,m), $y_w$ is the scene white, $y_{nm}$ is the luminance value of the input image at image coordinates (n,m), and $\Delta L$ is the scaling factor which controls the watermark strength.

In accordance with an aspect of the present invention, for scaling in the DCT domain, a stochastic approximation can be used. If $y_{nm}$ and $w_{nm}$ are considered as independent random variables, if y is normalized to the luminance range used in MPEG, namely from [0, 255] to [16, 235], and if $y_w=235$, then, based on Equations 1, the expected values of w' are $$E[w']=0.1607 \cdot E[w] \cdot E[y^{2/3}] \cdot \Delta L, y>17.9319$$

$$E[w']=0.2602 \cdot E[w] \cdot \Delta L, y \leq 17.9319 \quad (2)$$

Assuming that y has a normal distribution with mean $\alpha$ and variance $\beta^2$, the $E[y^{2/3}]$-term in Equation (2) can be represented as $$E[y^{2/3}] = \int_{17.9319}^{235} t^{2/3} \cdot \frac{1}{\sqrt{2\pi\beta^2}} e^{-\frac{(t-\alpha)^2}{2\beta^2}} dt = f(\alpha, \beta^2) \quad (3)$$

Thus, $E[y^{2/3}]$ is a function of the mean and the variance of the pixel values.

Equation (2) specifies a relationship between the moments of random variables w, w' and y. This relationship can be extended to the deterministic case to simplify Equation (2), resulting in a linear approximation.

For each 8 by 8 image block, the mean and variance of the block are used to approximate $\alpha$ and $\beta^2$ in Equation 3, and the mean $\alpha$ is used to approximate y in deciding which of the formulae to use in Equation 2.

$$w'_{ijk}=0.1607 \cdot w_{ijk} \cdot f(\alpha,\beta^2) \cdot \Delta L, \alpha>17.9319,$$

$$w'_{ijk}=0.2602 \cdot w_{ijk} \cdot \Delta L, \alpha \leq 17.9319 \quad (4)$$

where, for k=0, . . . , 63, $w_{ijk}$ is the k-th pixel of the i,j-th 8 by 8 block in the watermark image. $w'_{ijk}$ is for the scaled watermark.

Equation 4 approximates the nonlinear function according to Equation 2, by linear functions block by block. The scaled watermark strength depends on the mean and variance of the image block. For each image block, the higher the mean (i.e. the brighter), and the higher the variance (i.e. the more cluttered), the greater the required strength of the watermark for maintaining consistent visibility of the watermark.

The DCT of Equation 4 can be used to obtain the DCT of the watermark mask, which can be inserted in the image in the DCT domain. The mean and variance of the input image can be derived from the DCT coefficients, $$\alpha = (Y_{DC}/8) \text{ and} \quad (5)$$

$$\beta^2 = Var(y) = \frac{\sum_{i=0}^{63} Y_i^2}{64} - \frac{Y_{DC}^2}{64} = \frac{\sum_{i=1}^{63} Y_i^2}{64} = \frac{(\sum Y_{AC}^2)}{64} \quad (6)$$

where $Y_{DC}$ and $Y_{AC}$ are DC- and AC-DCT coefficients, respectively, of the image block Y.

A new watermark mask is calculated for each I-frame and P-frame, the latter in case of a scene cut. For I-frames, all DCT coefficients are readily accessible after minimal decoding of the MPEG sequence, i.e. inverse variable length coding, inverse run length coding and inverse quantization. For P-frames, since most blocks are in the scene cut, these DCT coefficient can be used immediately. For non-intra coded blocks, the average DC and AC energy obtained from intra coded blocks are substituted.

For further speed-up, the block-based $(\alpha_{ij}, \beta_{ij})$ pair can be replaced by the average $(\bar{\alpha}, \bar{\beta})$ over the whole image or over certain regions. In the following, a multi-region approach is described.

Figure 2A:
FIG. 2a is a watermark mask.
Figure 5:
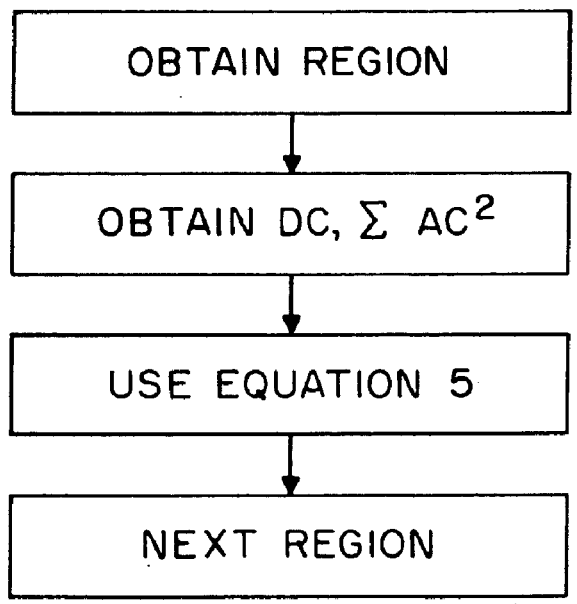
FIG. 5 is a flow diagram of scaling for a region.

The input image can be separated into many rectangular regions. As illustrated by FIG. 5, for each region an $(\bar{\alpha}, \bar{\beta})$ pair is calculated, and the mask is generated accordingly. Typically, the watermark is divided into top and bottom regions. This is suitable for most outdoor views with sky in the upper half of the frame and darker scenery in the lower half, as shown in FIG. 2a, for example. Each region will have a relatively visible watermark using different $(\bar{\alpha}, \bar{\beta})$ pairs.

To enhance the security of the watermark further, a randomized location shift can be applied to the watermark image before applying the DCT. This makes removal of the watermark more difficult for attackers who are in possession of the original watermark image, e.g. when a known logo is used for watermark purposes. Sub-pixel randomized location shifting will make it very difficult for the attacker to remove the watermark without leaving some error residue.

The following can be used for shifting. Two random numbers, for x- and y-direction, respectively, are generated and normalized to lie between −1.00 to 1.00. In the spatial domain, sub-pixel shifting is effected by bi-linear interpolation which involves only linear scaling and addition. In the DCT domain, a similar bi-linear operation can be used.

(ii) Motion Compensation Module

Once the DCT blocks of the watermark have been obtained, they are inserted into the DCT frames of the input video in one of three ways, as illustrated by FIG. 4, Section (ii). For I-frame or intra coded blocks in the B- or P-frames, the DCT of the scaled watermark is added directly:

$$E'_{ij}=E_{ij}+W'_{ij} \quad (7)$$

where $E'_{ij}$ is the i,j-th resulting DCT block, $E_{ij}$ the original DCT block, and $W'_{ij}$ the scaled watermark DCT according to Equation 6.

For blocks with forward motion vector in P-frame, or backward motion vector only in B-frame, the watermark added in the anchor frame has to be removed when adding the current watermark. The resulting DCT error residue is:

$$E'_{ij}=E_{ij}-MCDCT(W'_F,V_{Fij})+W'_{ij} \quad (8)$$

where MCDCT is the motion compensation function in the DCT domain as described in the above-referenced paper by S.-F. Chang et al. $W'_F$ is the watermark DCT used in the forward anchor frame, and $V_{Fij}$ is the forward motion vector, as shown in FIG. 1.

Figure 1:
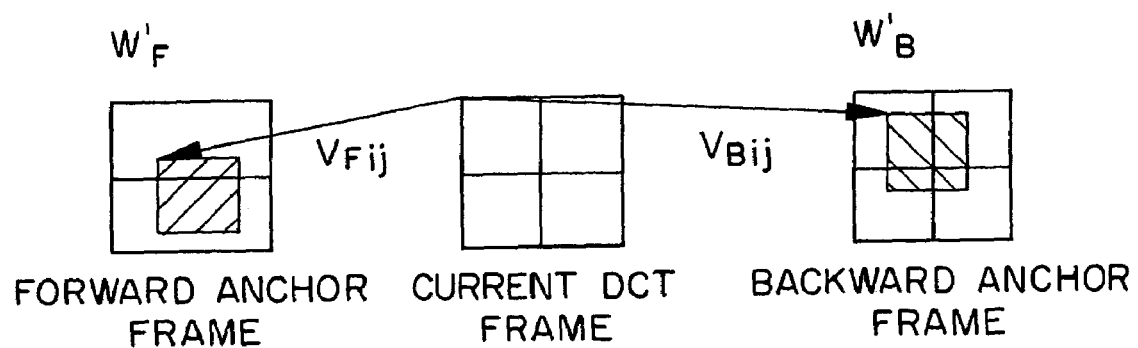
FIG. 1 is an illustration for motion-compensated discrete cosine transformation (MC-DCT).

For bidirectional predicted blocks in B-frame, both forward and backward motion compensation has to be averaged and subtracted when adding the current watermark:

$$E'_{ij}=E_{ij}-(MCDCT(W'_F,V_{Fij})+MCDCT(W'_B,V_{Bij}))/2+W'_{ij} \quad (9)$$

where $V_F$ and $V_B$ are forward and backward motion vector, respectively, as shown in FIG. 1.

For skipped blocks, which are the 0-motion, 0-residue error blocks in B- and P-frames, no operations are necessary, as the watermark inserted in the anchor frame will be carried over.

For control of the final bit rate one or more of the following features can be included:

1. Quantize/inverse-quantize the DCT coefficients of the watermark so that most high-frequency coefficients will become zero. The result is a coarser watermark, using fewer bits.

2. Cut off high-frequency coefficients. The effect is similar to low-pass filtering in the pixel domain. There results a smoother watermark with more rounded edges.

3. Motion vector selection, setting the motion vector of a micro-block in P-frame to 0 when the error residue from using motion compensation of this motion vector is larger than without its use.

If the motion vector is used, the residual error is $$E'_{ij} = E_{ij} - MCDCT(w'_F, V_{Fij}) + w'_{ij};$$

otherwise set $V_{Fij} = 0$.

$$E''_{ij} = E_{ij} - MCDCT(I_F, V_{Fij}) + w'_{ij}$$

where $I_F$ is the DCT of anchor frame.

If $|E''_{ij}| < |E'_{ij}|$, set $V_{Fij} = 0$.

Figure 2B:
FIG. 2b is an original image.
Figure 2C:
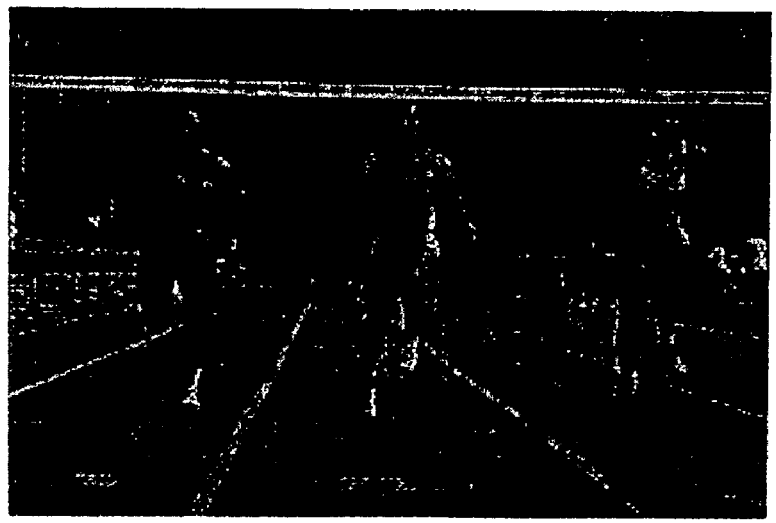
FIG. 2c is a superposition of the original image and the watermark mask.

FIGS. 2a, 2b and 2c illustrate the use of the adaptive watermarking techniques. FIG. 2a shows the original watermark mask. While a binary version is shown here, the algorithm is capable of handling gray scale with any specified transparent color. FIG. 2b shows an original image. FIG. 2c shows the new watermarked image.

The watermarking algorithm was tested on a HP J210 workstation, achieving a rate of 6 frames/second. Most of the computational effort went into the MC-DCT operations. If all possible MC-DCT blocks were precomputed, real time performance would be possible. This would require 12 megabytes of memory for 352×240 image size.

In accordance with an aspect of the invention, preferred watermarks offer robustness in that they are not easily defeated or removed by tampering. For example, if a watermark is inserted in MPEG video by the method described above, it would be necessary to recover the watermark mask, estimate the embedding locations by extensive sub-pixel block matching, and then estimate the $(\bar{\alpha}, \bar{\beta})$ factors for each watermark region. In experiments, there always remained noticeable traces in the tampered video, which can be used to reject false claims of ownership and to deter piracy.

For robustness, a watermark should not be binary, but should have texture which is similar to that of the scene on which it is placed. This can be accomplished by arbitrarily choosing an I-frame from the scene, decoding it by inverse DCT transform to obtain pixel values, and masking out the watermark from the decoded video frame.

When there is camera motion such as panning and zooming in a video sequence, an inserted watermark may be defeated by applying video mosaicing, i.e. by assembling a large image from small portions of multiple image frames. The watermark then can be filtered out as outlier. However, this technique will fail when there are actually moving objects in the foreground, as the watermark will be embedded in the moving foreground objects as well. As a countermeasure in accordance with a further embodiment of the invention, a watermark can be used which appears static relative to over-all or background motion. Such a camera motion using a 2-D affine model, and then translating and scaling the watermark using the estimated camera motion. The affine model can be described as follows:

The motion vectors in MPEG are usually generated by block matching: finding a block in the reference frame so that the mean square error is minimized. Although the motion vectors do not represent the true optical flow, it is still good in most cases to estimate the camera parameters in sequences that do not contain large dark or uniform regions.

When the distance between the object/background and the camera is large, it is usually sufficient to use a 6 parameter affine transform to describe the global motion of the current frame, $$\begin{bmatrix} u \\ v \end{bmatrix} = \begin{bmatrix} 1 & x & y & 0 & 0 & 0 \\ 0 & 0 & 0 & 1 & x & y \end{bmatrix} \cdot [a_1 \; a_2 \; a_3 \; a_4 \; a_5 \; a_6]^T$$

where $(x,y)$ is the coordinate of a macroblock in the current frame, $[u \; v]^T$ is the motion vector associated with that macroblock, $[a_1, a_2 \; a_3 \; a_4 \; a_5 \; a_6]^T$ is the affine transform vector. We denote U for $[u \; v]^T$, X for $$\begin{bmatrix} 1 & x & y & 0 & 0 & 0 \\ 0 & 0 & 0 & 1 & x & y \end{bmatrix},$$

and à for $[a_1 \; a_2 \; a_3 \; a_4 \; a_5 \; a_6]^T$.

Given the motion vector for each macroblock, we find the global parameter using the Least Squares (LS) estimation, that is to find a set of parameter à to minimize the error between the motion vectors estimated in (1) and the actual motion vectors obtained from the MPEG stream.

$$S(\hat{a}) = \sum_x \sum_y [(\hat{u}_{xy} - u_{xy})^2 + (\hat{v}_{xy} - v_{xy})^2]$$

where $[\hat{u}\hat{v}]^T$ is the estimated motion vector. To solve for à, set the first derivative of $S(\hat{a})$ to 0, then we get $$\begin{bmatrix} N & A & B \\ A & C & E \\ B & E & D \end{bmatrix} \cdot \begin{bmatrix} a_1 \\ a_2 \\ a_3 \end{bmatrix} = \begin{bmatrix} U_1 \\ U_2 \\ U_3 \end{bmatrix} \text{ and } \begin{bmatrix} N & A & B \\ A & C & E \\ B & E & D \end{bmatrix} \cdot \begin{bmatrix} a_4 \\ a_5 \\ a_6 \end{bmatrix} = \begin{bmatrix} V_1 \\ V_2 \\ V_3 \end{bmatrix}$$

where, $$N = \sum_x \sum_y 1, A = \sum_x \sum_y x, B = \sum_x \sum_y y,$$

$$C = \sum_x \sum_y x^2, D = \sum_x \sum_y y^2, E = \sum_x \sum_y x \cdot y,$$

$$U_1 = \sum_x \sum_y u_{xy}, U_2 = \sum_x \sum_y u_{xy} \cdot x, U_3 = \sum_x \sum_y u_{xy} \cdot y,$$

$$V_1 = \sum_x \sum_y v_{xy}, \quad V_2 = \sum_x \sum_y v_{xy} \cdot x, \quad V_3 = \sum_x \sum_y v_{xy} \cdot y.$$

All summations are over all valid macro-blocks whose motion vectors survive after the nonlinear noise reduction process. After the first LS estimation, motion vectors that have large distance from the estimated ones are filtered out before a second LS estimation. The estimation process is iterated several times to refine the accuracy.

Dominant motion can be estimated using clustering as follows:

For each B- or P-frame, obtain the forward motion vectors.

Assign each motion vector to one of a number (e.g. 4) of pre-defined classes.

Perform one round of global affine parameter estimation.

Assign the global affine parameter to the first class and assign zero to all other classes.

Iterate a number of times, e.g. 20, or until the residual error is stabilized: assigning each motion vector to the class that minimizes Euclidean distance and recalculating the 2-D affine parameters for each class using its member motion vectors.

The invention claimed is:

1. A method for including a watermark in a digital image, comprising:

obtaining digital data of a transformed representation of an image;

determining a transformed representation of the watermark for optimized visibility of the watermark in the image; and superposing the transformed representation of the watermark on the transformed representation of the image.

2. The method in accordance with claim 1, wherein the transformed representation of the image is a compressed representation.

3. The method in accordance with claim 1, wherein the transformed representation of the image is a discrete cosine transformed representation.

4. The method in accordance with claim 1, wherein the image is one of a sequence of video images.

5. The method in accordance with claim 3, wherein the transformed representation includes motion compensation.

* * * * *